(12) United States Patent
Kavanapillil et al.

(10) Patent No.: US 9,047,541 B2
(45) Date of Patent: Jun. 2, 2015

(54) MOBILE DEVICE PRINTING THROUGH PRINT SERVICE PROVIDER

(71) Applicant: Hewlett-Packard Development Company, L.P., Houston, TX (US)

(72) Inventors: Ramesh Kavanapillil, Bangalore (IN); Venugopal Kumarahalli Srinivasmurthy, Bangalore (IN); Laurent Pizot, Camas, WA (US); Viswanatha Shankaranarayana, Bangalore (IN)

(73) Assignee: Hewlett-Packard Development Company, LP., Houston, TX (US)

(*) Notice: Subject to any disclaimer, the term of this patent is extended or adjusted under 35 U.S.C. 154(b) by 107 days.

(21) Appl. No.: 13/627,893

(22) Filed: Sep. 26, 2012

(65) Prior Publication Data
US 2014/0085663 A1 Mar. 27, 2014

(51) Int. Cl.
*G06F 3/12* (2006.01)
*G06K 15/02* (2006.01)
*G06K 15/00* (2006.01)
*H04N 1/00* (2006.01)

(52) U.S. Cl.
CPC ........ *G06K 15/02* (2013.01); *G06F 3/126* (2013.01); *G06F 3/1204* (2013.01); *G06K 15/1805* (2013.01); *G06K 15/40* (2013.01); *G06K 15/408* (2013.01); *H04N 1/00* (2013.01); *G06F 3/1203* (2013.01); *G06F 3/1226* (2013.01); *G06F 3/1231* (2013.01); *G06F 3/1271* (2013.01); *G06F 3/1287* (2013.01); *G06F 3/1288* (2013.01); *G06F 3/1292* (2013.01)

(58) Field of Classification Search
USPC ........................................... 358/1.15
See application file for complete search history.

(56) References Cited

U.S. PATENT DOCUMENTS

| 2006/0080384 | A1* | 4/2006 | Robinson et al. ......... 709/203 |
| 2008/0304101 | A1* | 12/2008 | Sasase ................. 358/1.15 |
| 2009/0195812 | A1 | 8/2009 | Park |
| 2011/0292445 | A1 | 12/2011 | Kato |
| 2012/0069386 | A1 | 3/2012 | St. Laurent et al. |
| 2012/0099566 | A1 | 4/2012 | Laine et al. |
| 2012/0287460 | A1* | 11/2012 | McMillin et al. .......... 358/1.15 |
| 2013/0003126 | A1* | 1/2013 | Van Osdol et al. ........ 358/1.15 |

OTHER PUBLICATIONS

CSR; DirectOffice(TM) Mobile Print 3.0 Now Shipping in Tier One Mobile Phones and Tablets; Mobile World Congress 2012; Feb. 27, 2012.
Tap n' Print with NFC; Mar. 22, 2012; http://contactlessintelligence.com/2012/03/22/tap-n-print-with-nfc/.

* cited by examiner

*Primary Examiner* — Fred Guillermety
(74) *Attorney, Agent, or Firm* — Hewlett-Packard Patent Department (57) ABSTRACT

In an example implementation, a processor-readable medium stores code representing instructions that when executed by a processor cause the processor to retrieve a unique printer identification (ID) over a short-range wireless communication (e.g., NFC) between a mobile device and a public printer. The processor discovers a current geographic location of the mobile device from GPS technology on the mobile device. The processor then uploads the unique printer ID and the geographic location to a cloud-based print service provider.

16 Claims, 6 Drawing Sheets

Fig. 7

MOBILE DEVICE PRINTING THROUGH PRINT SERVICE PROVIDER

BACKGROUND

With the proliferation of mobile devices, such as smart phones and tablet computers, the ability to print from such devices is becoming more and more important. Printing remains a fundamental tool that provides many benefits, such as increased productivity in various business environments, and improved user experiences with regard to different types of printable media, such as photographs, news articles, magazines, text books, and so on. Because of the importance of printing in an ever-increasing mobile computing environment, improving user access to valuable print services is an ongoing endeavor for print service providers.

BRIEF DESCRIPTION OF THE DRAWINGS

The present embodiments will now be described, by way of example, with reference to the accompanying drawings, in which.

DETAILED DESCRIPTION

Overview

As generally noted above, the proliferation of mobile devices such as smart phones and tablet computers is driving print service providers to improve and expand their mobile print solutions. Print vendors and print service providers have developed mobile print solutions using technologies that have enabled printing from mobile devices in a number of ways. For example, there are cloud-based print solutions hosted on the servers of various print service's that are accessible via the Internet. Some cloud-based print solutions enable users to print documents to web-connected printers by sending an email. The email includes print job attachments, and it can be sent using any email client, including email clients used with mobile devices. The email is received by the cloud-based print service, and the print job attachments are separated from the email. The print jobs are then individually rendered and printed on the printer associated with the email address to which the email is sent.

While this and other mobile print services provide solutions that enable printing to web-connected printers, they do not offer an easy way to discover web-connected printers or to detect the exact geographic location and coordinates of the web-connected printers. Thus, creating and maintaining printer location awareness of web-connected printers in cloud-based print services remains a challenge. Depending on the type of network environment, different methods may be available for discovering web-connected printers. For example, in private/corporate enterprise network settings, web-connected printers can be discovered using proximity protocols. In local area networks, there are other solutions that allow automatic discovery using LAN based technology. However, public web-connected printers are geographically scattered throughout the world, and the methods used in private enterprise and LAN settings are not available for discovering and locating such public web-connected printers.

Current solutions for discovering a publicly available web-connected printer for a cloud-based print service typically involve a registration process that identifies and locates the web-connected printer to the cloud-based service, for example, through a printer email address, an identification code, and GPS coordinates. However, the process of providing the exact location and other printer information to such cloud-based services is both cumbersome and error prone for printer owners. For example, printer location information is typically manually entered every time a printer is physically moved. Another solution involves the use of GPS technology built into printers to create printer location awareness to the cloud-based service. However, this solution is usually limited to particular high-end printing devices, and is not used in low-end consumer printers due to the significant expense of deploying the GPS technology in the printer.

Embodiments of the present disclosure enable public printer discovery and location through a mobile device based discovery application that facilitates the automatic detection of a printer's geographic location. The automatic detection occurs when a printer owner 'touches' a mobile device to the printer or brings the two devices in close proximity with one another, initiating communication through a near field communication technology or another short-range wireless communication technology. The near field communication prompts the discovery application on the mobile device to access the GPS technology on the mobile device and determine the GPS location of the mobile device. This enables a cloud-based print service platform to automatically discover the location of the printer and provide location aware services to consumers (i.e., the printer users) based on the printer location. The use of a short-range wireless communication technology between the printer and mobile device eliminates the error prone manual entry of printer location information each time the printer is physically moved, as well as eliminating any need for GPS technology within the printer. The disclosed embodiments further allow users to automatically detect public printers nearest to their current GPS location, whether or not such printers are within close range. This enables users to print to a personal print queue on the cloud-based print service at anytime, and then walk to the nearest public printer, touch their mobile device to the printer, personalize the public printer, access their personal print queue, and print any or all jobs from within the print queue.

In an example embodiment, a processor-readable medium stores code representing instructions that when executed by a processor cause the processor to retrieve a unique printer identification (ID) over a short-range wireless communication between a mobile device and a public printer. The processor further discovers the geographic location of the mobile device from GPS technology on the mobile device. It then uploads the unique printer ID and the geographic location to a cloud-based print service provider.

In another example embodiment, a processor-readable medium stores code representing instructions that when executed by a processor cause the processor to send a request from a mobile device to establish a user print queue on a print service provider. The request includes a user ID to associate the user print queue with the mobile device. The instructions further cause the processor to send a print job and the user ID from the mobile device to the print service provider, to have the print job stored in the user print queue associated with the user ID. Print jobs can be sent to the print service provider for storage in the user print queue on a continual basis.

In another example embodiment, a processor-readable medium stores code representing instructions that when executed by a processor cause the processor to receive a request from a user mobile device for a user print queue. The request include a user ID to be associated with the user print queue. The processor establishes a user print queue associated with the user ID. Thereafter, print jobs are received from the user mobile device, and stored in the user print queue associated with the user ID. In one implementation, a print request from a user mobile device includes the user ID and a current geographic location of the user mobile device. A list of print jobs from the user print queue, and a list of public printers within a specified geographic radius of the current geographic location of the user mobile device, are determined and returned to the user mobile device. A selected print job indication and public printer indication are received from the user mobile device, and the selected print job is sent to the selected public printer for printing.

Illustrative Embodiments

Figure 1:
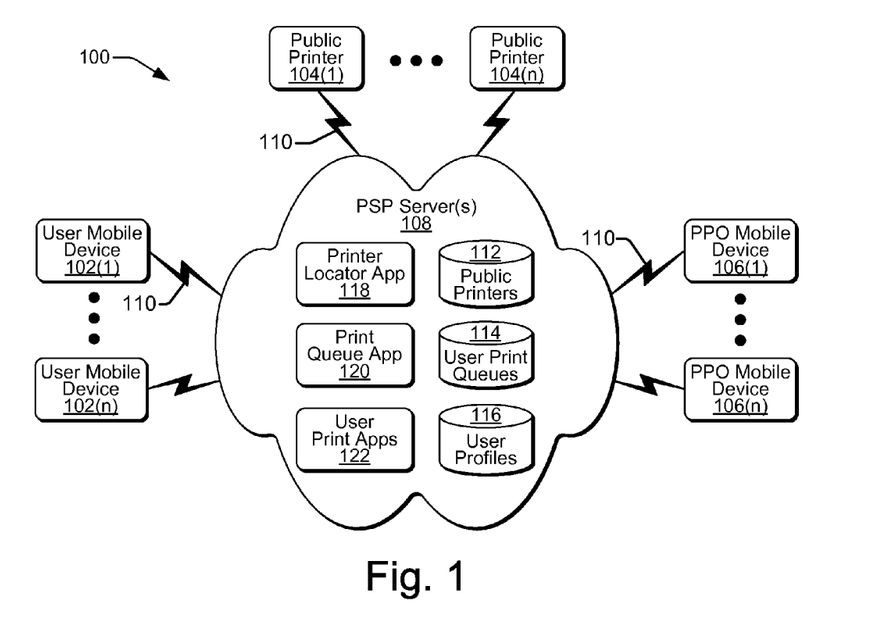
FIG. 1 shows an example network environment suitable for discovering, locating, and printing to a public printer through a cloud-based print service provider, according to an embodiment.

FIG. 1 shows an example network environment 100 suitable for discovering, locating, and printing to a public printer through a cloud-based print service provider as generally disclosed herein, according to an embodiment. The environment 100 includes user/client mobile devices 102, web-connected public printers 104, public printer-owner (PPO) mobile devices 106, and one or more cloud-based print service provider (PSP) servers/platform 108, coupled variously through a network 110. A "cloud-based" PSP in this context is generally intended to include PSP's whose resources, applications, etc., are made available to users via the Internet from one or more of the PSP servers 108. Accordingly, network 110 is generally intended to represent the Internet, but may also include any of a variety of conventional network topologies and types (including optical, wired and/or wireless networks), employing any of a variety of conventional network protocols (including public and/or proprietary protocols) that facilitate connection with the Internet. For example, in addition to the Internet, network 110 may include a home network, a corporate network, one or more local area networks (LANs) and/or wide area networks (WANs), and combinations thereof.

Various resources and applications are available on a PSP (print service provider) server/platform 108 to enable the discovery, location, personalization, and use, of public printers 104 by users of mobile devices 102. As illustrated in FIG. 1, for example, such resources include a store of public printers 112, a store of user print queues 114, and a store of user profiles 116. Applications available on a PSP server 108 that enable the use of such resources include a printer locator application 118, a print queue application 120, and user print applications 122.

The user/client mobile devices 102 and public printer-owner (PPO) mobile devices 106 are intended to represent mobile (i.e., handheld) computing devices such as smartphones, tablet computers, PDAs, and the like. As noted below, such devices can be equipped with various WI-FI technologies and GPS capabilities that enable connections to the Internet and other WI-FI capable devices. A user mobile device 102 generally represents a device from which a user prints print jobs to a print queue 114 on the cloud-based PSP server 108, and later controls the printing of one or more of such print jobs on a public printer 104. A PPO mobile device 106 generally represents a mobile device used by the owner of a printer who enables the printer as a public printer 104 for use by the cloud-based PSP 108. Thus, PPO, refers to a "public printer owner". A PPO is typically, but not necessarily, a print service provider. In general, a PPO may be any person owning a printer who enables the printer as a public printer 104 and identifies the printer with the PSP server 108 via a PPO mobile device 106 using the process described herein.

A public printer 104 is a web-connected (i.e., Internet connected) printer that has been discovered, located, and enabled to print through a cloud-based PSP server/platform 108 as described herein. A public printer 104 can be implemented as any of a variety of types of printers including, for example, inkjet printers, laser printers, all-in-one/multi-function printers, and so on.

Figure 2:
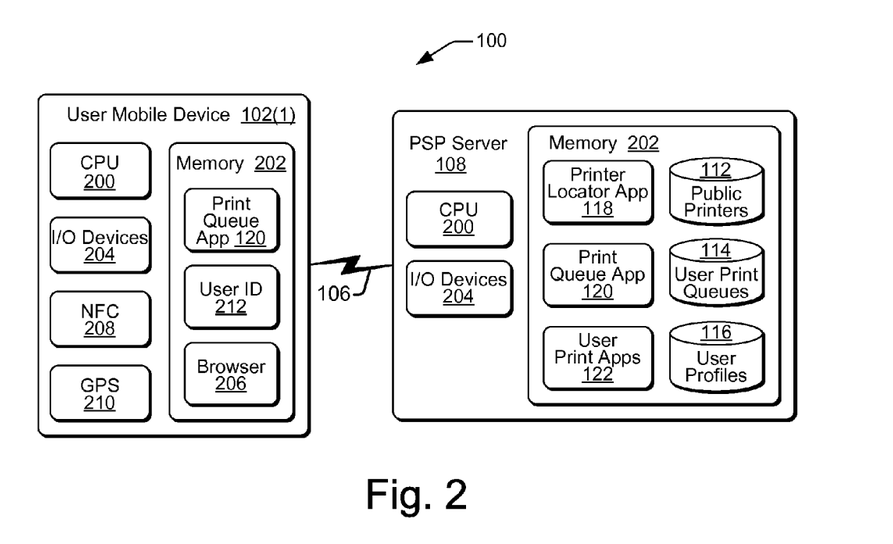
FIG. 2 shows an example implementation of a user mobile device and print service provider server, according to an embodiment.
Figure 3:
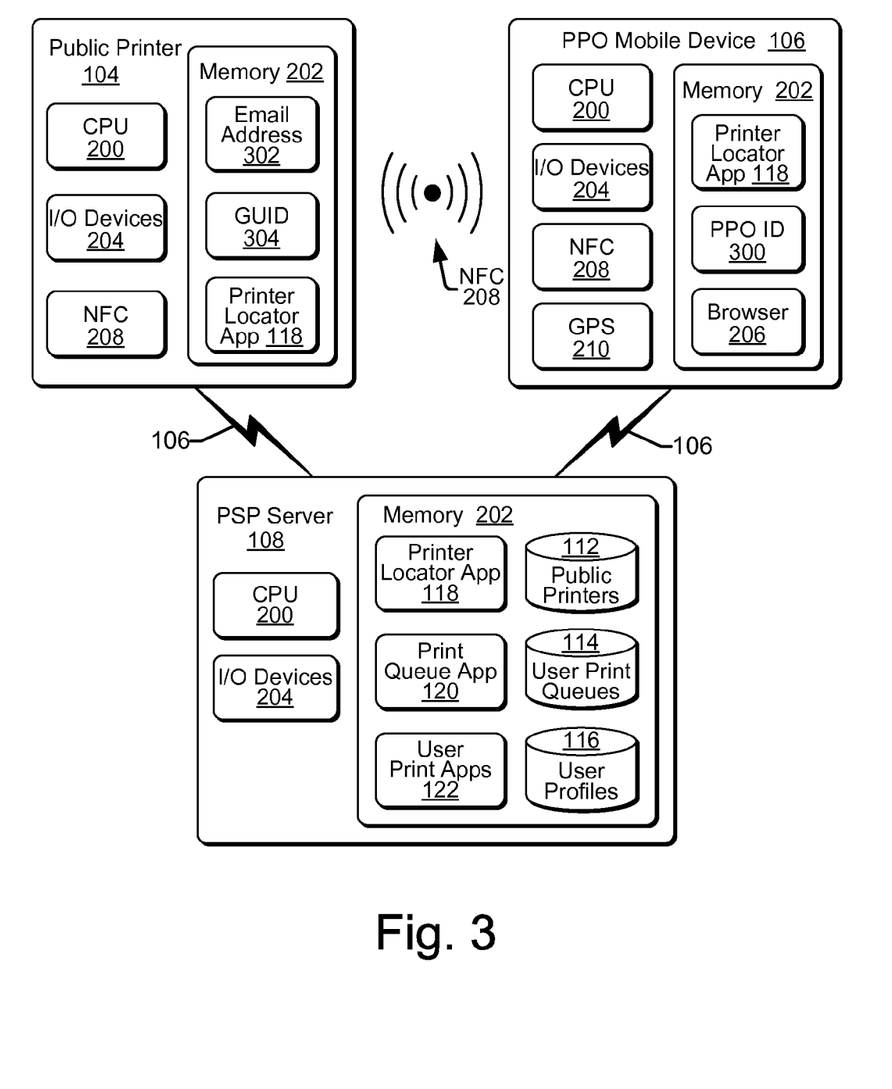
FIG. 3 shows an example implementation of a public printer owner mobile device, a public printer, and a print service provider server, according to an embodiment.
Figure 4:
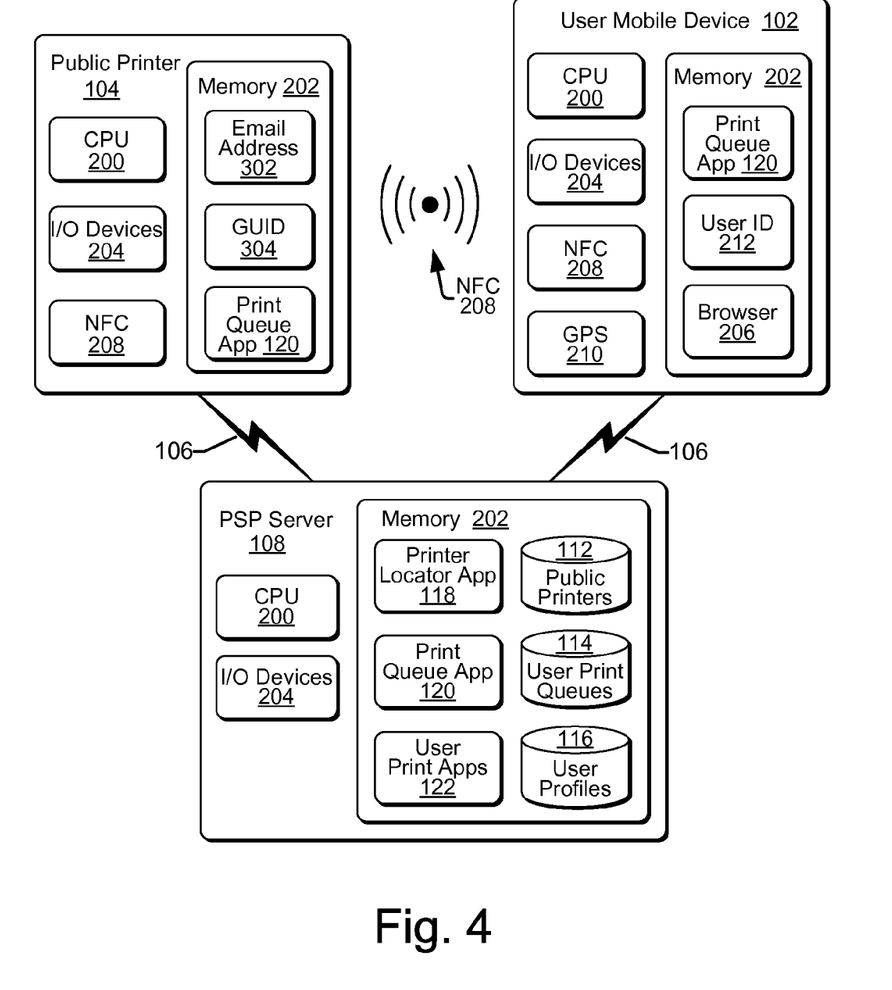
FIG. 4 shows example implementations of a user mobile device printing to a public printer through a print service provider server, according to embodiments.

Referring generally to FIGS. 2-4, each of the user mobile devices 102, public printers 104. PPO mobile devices 106, and PSP servers 108, incorporate components of a typical computing device, such as one or more processors (CPU) 200, and a memory 202. A memory 202 typically includes both volatile (i.e., RAM) and nonvolatile (e.g., ROM, hard disk, floppy disk, CD-ROM, etc.) memory components. The memory components of memory 202 comprise non-transitory computer/processor-readable media that provide storage of computer/processor-readable coded instructions, data structures, program modules, applications, and other data. The mobile devices 102 and 106, public printers 104, and PSP server 108, also typically include various input/output (I/O) devices 204 such as a keyboard, a mouse, and/or a display device such as a monitor or touch-sensitive screen, etc. Mobile devices 102 and 106, public printers 104, and PSP server 108, may implement (i.e., by execution on a processor 200) various application programs, such as word processing applications, image editing applications, web browsing applications 206, printer locator applications 118, print queue applications 120, print applications 122, and so on. Some applications, in conjunction with a short-range wireless communication technology such as NFC 208 (Near Field Communication), a GPS 210 (Global Positioning System) technology, and network 110, facilitate the discovery, location, personalization, and use of public printers 104 through the cloud-based print service 102, as discussed in greater detail herein below.

FIG. 2 shows an example implementation of a user mobile device 102 and PSP server 108 within environment 100, according to an embodiment. The user mobile device 102 implements NFC technology 208, or some other short-range wireless communication technology that enables the short range transfer of data between two similarly enabled devices, such as between the user mobile device 102 and a public printer 104. Besides NFC technology, other short-range wireless communication technologies may include radio frequency identification (RFID), Bluetooth, Gigabit Wireless (WiGig), and so on. User mobile device 102 also includes GPS 210 technology, which can provide current geographic location information for the device 102. In a memory 202, user mobile device 102 includes a print queue application 120, and a unique user identification (ID) 212. User mobile device 102 may also include a browser 206 or some other application software useful to access and present information resources on the Internet.

In the example implementation shown in FIG. 2, the user mobile device 102 requests and downloads (e.g., using browser 206) the print queue application 120 from the PSP server 108. Execution of the print queue application 120 on mobile device 102 (i.e., by a processor 200) enables the setup and use of a pre-purchased user print queue 114 located on the PSP server 108. Using the print queue application 120, a request is made to the PSP server 108 to establish a user print queue 114. The request includes sending user ID 212 information to the PSP server 108 no that the user print queue 114 is associated with the appropriate user. The print queue application 120 then allows a user to continually print to the user print queue 114 from the user mobile device 102. Printing to the user print queue 114 includes sending a print job to the PSP server 108, along with the user ID 212 so that the print job is stored in the appropriate user print queue 114. Once there are one or more print jobs stored in a user print queue 114, the print queue application 120 allows the user to print the one or more jobs on a public printer 104, as described herein below.

Browser 206 and/or the print queue application 120, also enable a user to setup a user profile 116 on the PSP server 108. Each user profile 116 is associated with a user ID 212, and each profile generally includes user information and user preferences. For example, a user profile 116 may include a user name, a user ID, a preferred geographic radius for identifying a list of nearest public printers, preferred printer settings for personalizing a public printer, preferred user print applications such as a scanning application, printable coupon applications, printable game applications, and so on. The user print applications 122 are stored in a memory 202 of the PSP server 108. In one implementation, the PSP server 108 provides location-aware services based on the geographic location of a public printer 104, as determined via the GPS technology 210 on a user mobile device 102. For example, printed output from a user print application 122 can be tailored to suit the geographic location of the public printer 104 on which the printed output is printed.

FIG. 3 shows an example implementation of a PPO (public printer owner) mobile device 106, a public printer 104, and a PSP server 108 within environment 100, according to an embodiment. The PPO mobile device 106 implements NFC technology 208, or some other short-range wireless communication technology such as RFID, Bluetooth, or WiGig. The PPO mobile device 106 also includes GPS 210 technology to provide current geographic location information of the PPO mobile device 106. In a memory 202, the PPO mobile device 106 includes a printer locator application 118, a unique PPO ID 300, and a browser 206 or some other application software able to access and present information resources on the Internet.

A public printer 104 includes a unique email address 302 and a globally unique ID (GUID) 304. Public printer 104 is also equipped with NFC technology 208, or other short-range wireless communication technology that corresponds with that of the PPO mobile device 106, to enable a short range transfer of data between the public printer 104 and PPO mobile device 106.

In the example implementation shown in FIG. 3, the discovery and location of a public printer 104 by a cloud-based PSP server/platform 108 begins with a PPO (public printer owner) who wants to enable and identify a printer as a public printer 104 for use through the PSP server 108. The PPO first downloads the printer locator application 118 from the PSP server 108 onto the PPO mobile device 106 over the network 110 using a browser 206, for example. The PPO then executes the printer locator application 118 on the PPO mobile device 106 and "touches", or brings within a close proximity, the PPO mobile device 106 to the public printer 104. The close proximity of the PPO mobile device 106 and public printer 104 initiates communication between the PPO mobile device 106 and public printer 104 using the NFC technology 208 (or other short-range wireless technology). Using the NEC technology 208, the printer locator application 118 on the PPO mobile device 106 reads the globally unique email address 302 and GUID 304 of the printer. The printer locator application 118 also accesses geographic location information from the GPS technology 210 on the mobile device 106 that indicates the current geographic location of the PPO mobile device 106. The printer locator application 118 on the PPO mobile device 106 then transmits the GPS location information, along with the email address 302 and GUID 304 of the printer to the PSP server 108. In other implementations, a public printer 104 may include a printer locator application 118 that it executes to read the geographic location from the GPS enabled PPO mobile device 106 via NFC. In these implementations, the public printer 104 uses this information to update the GPS location of the printer on to the PSP server, along with forwarding the email address 302 and GUID 304 of the printer to the PSP server 108. The PSP server 108 then updates its public printers store 118 with the identification information (i.e., the email address 302 and GUID 304 of the printer) and geographic location of the newly discovered public printer 104. The newly discovered public printer 104 is thus made available to users who want to print jobs from their user print queues 114 to a public printer 104 at or near the geographic location of the newly discovered public printer 104, as further discussed below.

FIG. 4 shows example implementations of a user mobile device 102 printing to a public printer 104 through a PSP server 108 within an environment 100, according to embodiments. In one implementation, a user discovers public printers 104 that are nearest to the user's geographic location. The user then selects one or more print jobs from a personal user print queue 114 on the PSP server 108 to be printed on one of the nearest public printers 104. In this implementation, the user executes the print queue application 120 on the user mobile device 102 which communicates with the PSP server 108 to discover the nearest public printers 104 with respect to the user's current location. The print queue application 120 accesses information on the user mobile device 102 including user ID 212 information and geographic location information from the GPS technology 210 on the user mobile device 102. The geographic location information indicates the current geographic location of the user mobile device 102. The print queue application 120 then makes a print request to the PSP server 108 and transmits the user ID 212 and user GPS location information to the PSP server 108 over the network 110. The PSP server 108, also executing a print queue application 120, uses the user ID 212 to locate the user's personal print queue 114 and to generate a list of print jobs previously uploaded to the PSP server 108 and stored in the print queue 114. The PSP server 108 uses the user GPS location information to determine which public printers 104 from its public printers store 112 are nearest to the user mobile device 102. Thus, the PSP server 108 compares the user GPS location information with public printer GPS location information stored in its public printers store 112, and generates a list of nearest public printers 104. The list of nearest public printers 104 can be tailored based on a preferred geographic radius currently specified by the user through the print queue application 120, or previously specified by the user in the user's profile 116 stored on the PPS server 108. The PSP server 108 transmits the list of nearest public printers 104 and the list of available user print jobs to the user mobile device 102. The user then selects one or more print jobs for printing, along with a public printer 104 from the list of nearest public printers 104. The print queue application 120 sends the selected print job(s) indication and the selected public printer 104 indication to the PSP server 108. The PSP server 108 then sends the selected print job(s) from the user print queue 114 to the selected public printer 104 for printing.

In an additional implementation illustrated in FIG. 4, a user and a public printer 104 are located at the same geographic location. In this implementation the user can personalize the public printer 104, print jobs to the public printer 102 from a user print queue 114 located on the PPS server 108, implement user print applications 122 from the PPS server 108 using the public printer 104, and so on.

In this additional implementation, the user first executes the print queue application 120 on the user mobile device 102 and "touches", or brings within a close proximity, the user mobile device 102 to the public printer 104. The close proximity of the user mobile device 102 and public printer 104 initiates communication between the user mobile device 102 and public printer 104 using the NFC technology 208 (or some other short-range wireless technology). Using the NFC technology 208, the print queue application 120 on the user mobile device 102 reads identification information from the public printer 104, such as the printer's globally unique email address 302 and GUID 304. The print queue application 120 also reads the user ID 212 from the user mobile device 102. The print queue application 120 on the user mobile device 102 then transmits the user ID 212 and the printer identification information (e.g., the printer's globally unique email address 302 and/or GUID 304) to the PSP server 108. In other implementations, a public printer 104 may include a print queue application 120 that it executes to read the user ID 212 from the user mobile device 102. The print queue application 120 on the public printer 104 then transmits the user ID 212 and the printer identification information (e.g., the printer's globally unique email address 302 and/or GUID 304) to the PSP server 108. In either implementation, the PSP server 108, also executing a print queue application 120, uses the user ID 212 to locate the user's personal print queue 114 and generate a list of print jobs previously uploaded to the PSP server 108 and stored in the print queue 114. The PSP server 108 also uses the user ID 212 to locate the appropriate user profile 116. The PSP server 108 sends information from the user profile 116 to the public printer 104 over network 110, using the printer's identification information (e.g., the printer's globally unique email address 302 and/or GUID 304) to locate and authenticate the public printer 104. Information from the user profile 116 is used to personalize the public printer 104 for the user. For example, the display screen on the public printer 104 may provide a personal greeting to the user, the printer may implement particular printer settings preferred by the user, and the printer may offer particular user print applications 122 for use by the user. Using the public printer's identification information, the PSP server 108 can determine the geographic location of the public printer from its store of public printers 112, and use the geographic location to regionalize print services, such as print services available through user print applications 122. For example, a coupon printing application can be regionalized to the location of the public printer 104 such that the user is able to print coupons applicable to the user's current geographic location. The PSP server 108 also sends the list of print jobs from the user's print queue 114 to the user mobile device 102, and/or the public printer 104. The user can indicate a selection of one or more of the print jobs for printing to the public printer 104. The print queue application 120 sends the selected print job(s) indication to the PSP server 108, and the PSP server 108 then sends the selected print job(s) from the user print queue 114 to the selected public printer 104 for printing.

Figure 5:
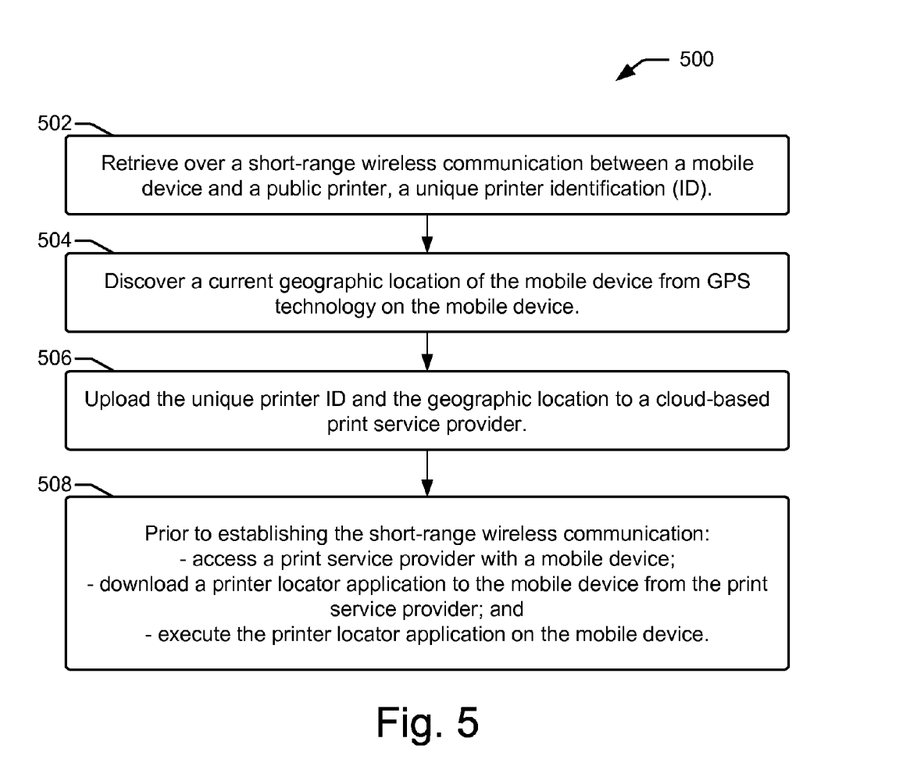
FIGS. 5-7, show flowcharts of example methods related to discovering, locating, and printing to public printers through a cloud-based print service, according to different embodiments.
Figure 6:
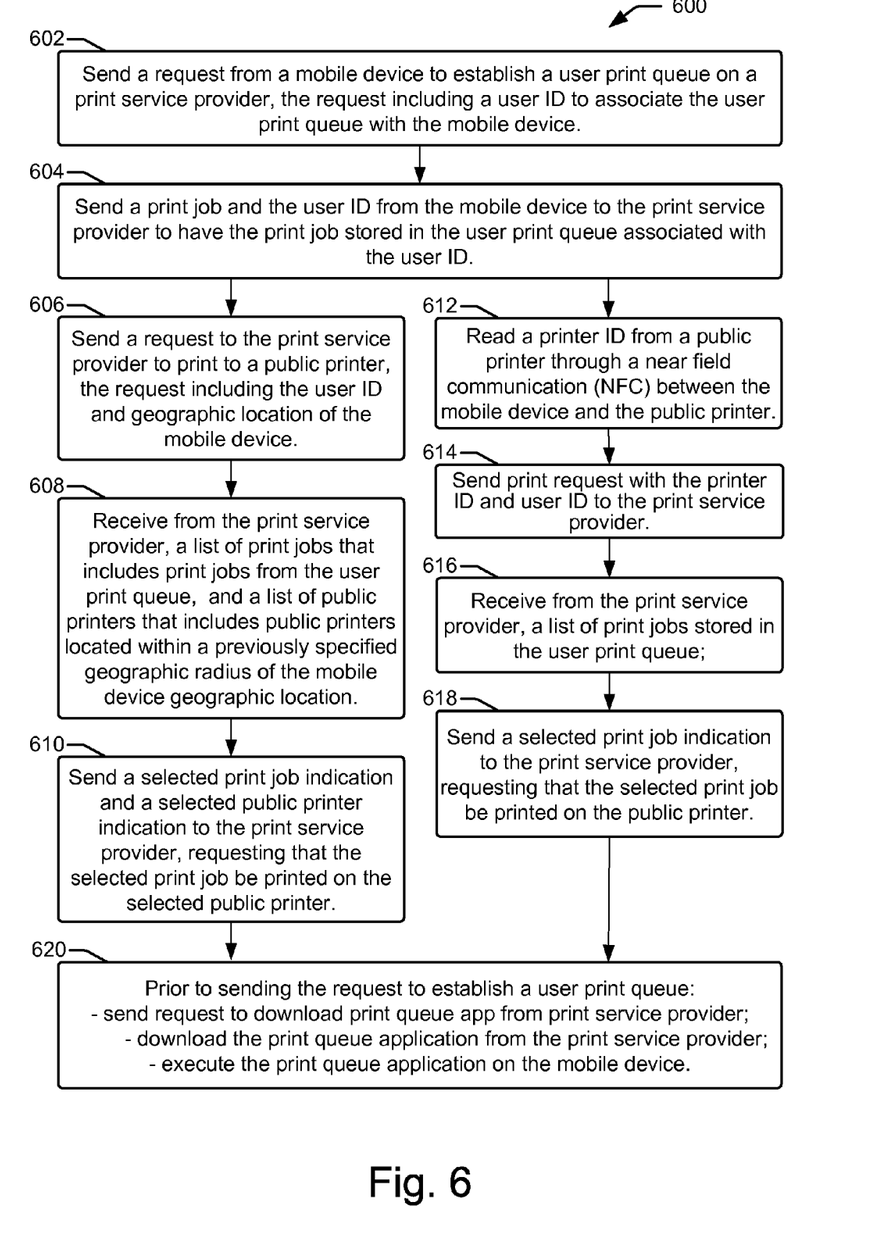
Figure 7:
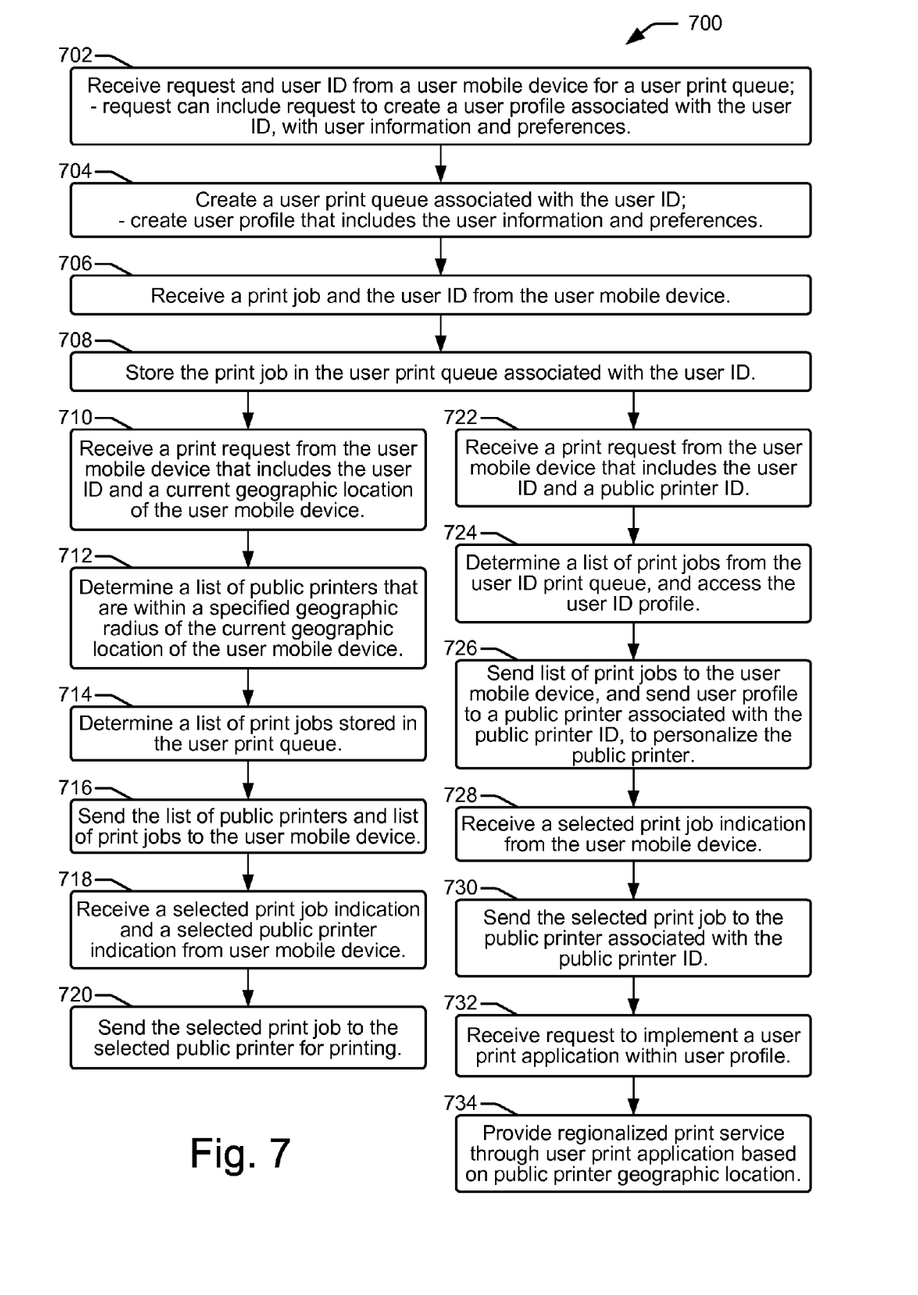

FIGS. 5-7, show flowcharts of example methods 500, 600, and 700, related to discovering, locating, and printing to public printers through a cloud-based print service provider as generally disclosed herein, according to different embodiments. Methods 500, 600, and 700, are associated with the embodiments discussed above with regard to FIGS. 1-4, and details of the steps shown in methods 500, 600, and 700, can be found in the related discussion of such embodiments. The steps of methods 500, 600, and 700, may be embodied as programming instructions stored on a non-transitory computer/processor-readable medium, such as memory 202 of FIGS. 2-4. In one example, the implementation of the steps of methods 500, 600, and 700, is achieved by the reading and execution of such programming instructions by a processor, such as processor 200 of FIGS. 2-4. Methods 500, 600, and 700, may include more than one implementation, and different implementations of methods 500, 600, and 700, may not employ every step presented in the respective flowcharts. Therefore, while steps of methods 500, 600, and 700, are presented in a particular order within their respective flowcharts, the order of their presentation is not intended to be a limitation as to the order in which the steps may actually be implemented, or as to whether all of the steps may be implemented. For example, one implementation of method 700 might be achieved through the performance of a number of initial steps, without performing one or more subsequent steps, while another implementation of method 700 might be achieved through the performance of all of the steps.

Referring to FIG. 5, method 500 begins at block 502, with retrieving or reading a unique printer identification (ID) from a printer over a short-range wireless communication (e.g., NFC) established between a mobile device and a public printer. At block 504, a current geographic location of the mobile device is discovered from GPS technology on the mobile device. The unique printer ID and the current geographic location of the mobile device are then uploaded to a cloud-based print service provider, as shown at block 506. At block 508, in one implementation of method 500, prior to establishing the short-range wireless communication shown at block 502, a print service provider is first accessed with the mobile device, and a printer locator application is downloaded to the mobile device from the print service provider and executed on the mobile device.

Referring now to FIG. 6, method 600 begins at block 602, with sending a request from a mobile device to establish/create a user print queue on a print service provider. The request sent from the mobile device includes a user ID to associate the user print queue with the mobile device. At block 604 of method 600, a print job and the user ID are sent from the mobile device to the print service provider to have the print job stored in the user print queue that is associated with the user ID. Any number of print jobs can be sent to the print service provider for storage in the user print queue. In one implementation of method 600, beginning at block 606, printing to a public printer can be initiated with a request sent to the print service provider from the mobile device to print to a public printer. The request includes the user ID and the current geographic location of the mobile device. In response to the request, as shown at block 608, the mobile device receives from the print service provider, a list of print jobs that includes print jobs from the user print queue, and a list of public printers that includes public printers located within a previously specified geographic radius of the mobile device geographic location. The specified geographic radius can be specified, for example, in the request to print to the public printer, or in a user profile stored on the print service provider server. As shown at block 610, a selected print job indication and a selected public printer indication are then to the print service provider with a request that the selected print job be printed on the selected public printer.

In another implementation of method 600, beginning at block 612, a printer ID from a public printer is read through a near field communication (NFC) between the mobile device and the public printer. A print request, along with the printer ID and user ID are than sent to the print service provider at block 614. At block 616 of method 600, a list of the print jobs stored in the user print queue is received from the print service provider, and at block 618, a selected print job indication is sent back to the print service provider, requesting that the selected print job be printed on the public printer. In both implementations of method 600, as shown at block 620, prior to sending the request to establish/create a user print queue at block 602, a request to download a print queue application from the print service provider is sent, and the print queue application is downloaded from the print service provider and executed on the mobile device.

Referring now to FIG. 7, method 700 begins at block 702, with receiving a request and user ID from a user mobile device to create a user print queue on a print service provider. The request can also include a request to create a user profile associated with the user ID. User information and user preferences can be included in the request to create the user profile. At block 704, a user print queue associated with the user ID is created, and a user profile containing the user information and user preferences is created. At block 706, a print job and the user ID are received from the user mobile device, and the print job is stored in the user print queue associated with the user ID, as shown at block 708. In one implementation of method 700, beginning at block 710, a print request is received from the user mobile device. The print request includes the user ID and a current geographic location of the user mobile device. At blocks 712 and 714, respectively, this implementation continues with determining a list of public printers that are within a specified geographic radius of the current geographic location of the user mobile device, and determining a list of print jobs from jobs stored within the user print queue. At block 716 of method 700, the list of public printers and list of print jobs are then to the user mobile device. A selected print job indication and a selected public printer indication are then received from the user mobile device, as shown at block 718. The selected print job is then sent by the print service provider to the selected public printer for printing.

In another implementation of method 700, beginning at block 722, a print request is received from the user mobile device. The request includes the user ID and a public printer ID. At block 724, a list of print jobs is determined from the user print queue based on the user ID, and the user profile associated with the user ID is accessed. As shown at block 726, the list of print jobs is sent to the user mobile device, and the user profile information is sent to a public printer associated with the public printer ID, to personalize the public printer. At block 728, a selected print job indication is received from the user mobile device, and the selected print job is sent to the public printer associated with the public printer ID for printing, as shown at block 730. As shown at block 732, a request may be received to implement a user print application indicated within the user profile information sent to the public printer. In response to the request, a regionalized print service can be provided through the user print application that is based on the geographic location of the public printer.

What is claimed is:

1. A non-transitory processor-readable medium storing instructions that when executed by at least one processor cause the at least one processor to:
    send a request from a mobile device to establish a user print queue on a print service provider, the request including a user ID to associate the user print queue with the mobile device;
    send a print job and the user ID from the mobile device to the print service provider to have the print job stored in the user print queue associated with the user ID;
    retrieve, in a wireless communication between the mobile device and a printer, a printer ID of the printer;
    discover a current geographic location of the mobile device from GPS technology on the mobile device; and
    upload the printer ID and the geographic location to the print service provider.

2. The non-transitory processor-readable medium of claim 1, wherein the instructions further cause the at least one processor to, prior to sending the request:
    send a request to download a print queue application from the print service provider;
    download the print queue application from the print service provider; and
    execute the print queue application on the mobile device.

3. The non-transitory processor-readable medium of claim 1, wherein the instructions further cause the at least one processor to:
    send a print request with the printer ID and the user ID to the print service provider;
    receive from the print service provider, a list of print jobs stored in the user print queue; and
    send a selected print job indication to the print service provider, requesting that the selected print job be printed on the printer.

4. The non-transitory processor-readable medium of claim 1, wherein the wireless communication is a communication selected from the group consisting of a near field communication (NFC), a radio frequency identification (RFID) communication, a Bluetooth communication, and a Gigabit Wireless (WiGig) communication.

5. A non-transitory processor-readable medium storing instructions that when executed by a mobile device, cause the mobile device to:
    send a request from the mobile device to establish a user print queue on a print service provider, the request including a user ID to associate the user print queue with the mobile device;
    send a print job and the user ID from the mobile device to the print service provider to have the print job stored in the user print queue associated with the user ID;
    send a request from the mobile device to the print service provider to print to a printer, the request to print including the user ID and a geographic location of the mobile device; and
    receive, by the mobile device in response to the request to print, a list of print jobs and a list of printers from the print service provider, the list of print jobs including print jobs from the user print queue and the list of printers including printers located within a specified geographic radius of the geographic location of the mobile device.

6. The non-transitory processor-readable medium of claim 5, wherein the instructions further cause the mobile device to:
    send a selected print job indication and a selected printer indication to the print service provider, requesting that the selected print job be printed on the selected printer.

7. A non-transitory processor-readable medium storing instructions that when executed by at least one processor cause the at least one processor to:
- receive a request from a user mobile device to create a user print queue on a print service provider, the request including a user ID;
- create the user print queue associated with the user ID;
- receive a print job and the user ID from the user mobile device;
- store the print job in the user print queue associated with the user ID;
- receive a print request from the user mobile device that includes the user ID and a printer ID;
- access a user profile associated with the user ID, and send user information and preferences of the user profile to a printer associated with the printer ID to personalize the printer for a user, wherein the user preferences specify a user print application;
- compare the printer ID with a printer store to determine a geographic location of the printer; and
- regionalize print services associated with the user print application based on the geographic location of the printer.

8. The non-transitory processor-readable medium of claim 7, wherein the instructions further cause the at least one processor to:
- receive a second print request from the user mobile device that includes the user ID and a current geographic location of the user mobile device;
- determine a list of printers that are within a specified geographic radius of the current geographic location of the user mobile device;
- determine a list of print jobs stored in the user print queue;
- send the list of printers and list of print jobs to the user mobile device;
- receive a selected print job indication and a selected printer indication from the user mobile device; and
- send the selected print job to the selected printer for printing.

9. The non-transitory processor-readable medium of claim 7, wherein the instructions further cause the at least one processor to:
- determine a list of print jobs stored in the user print queue associated with the user ID;
- send the list of print jobs to the user mobile device;
- receive a selected print job indication from the user mobile device; and
- send the selected print job to the printer.

10. The non-transitory processor-readable medium of claim 9, wherein the instructions further cause the at least one processor to:
- receive a request to create the user profile associated with the user ID, the request to create including the user information and the preferences; and
- create the user profile to include the user information and the preferences.

11. The non-transitory processor-readable medium of claim 7, wherein the user information and preferences in the user profile comprise a user name, a user ID, a preferred geographic radius for identifying a list of nearest printers, preferred printer settings for personalizing a printer, and the user print application.

12. A method comprising:
- sending, by at least one processor, a request from a mobile device to establish a user print queue on a print service provider, the request including a user ID to associate the user print queue with the mobile device;
- sending, by the at least one processor, a print job and the user ID from the mobile device to the print service provider to have the print job stored in the user print queue associated with the user ID;
- retrieving, in a short-range wireless communication between the mobile device and a public printer, a unique printer identification (ID);
- discovering a current geographic location of the mobile device from GPS technology on the mobile device; and
- uploading the unique printer ID and the geographic location to the print service provider.

13. The method of claim 12, further comprising:
- sending a request to the print service provider to print to a public printer, the request including the user ID and the geographic location of the mobile device;
- receiving a list of print jobs and a list of public printers from the print service provider, the list of print jobs including print jobs from the user print queue and the list of public printers including public printers located within a specified geographic radius of the geographic location of the mobile device.

14. The method of claim 13, further comprising:
- sending a selected print job indication and a selected public printer indication to the print service provider, requesting that the selected print job be printed on the selected public printer.

15. The method of claim 12, further comprising:
- sending a print request with the printer ID and the user ID to the print service provider;
- receiving, from the print service provider, a list of print jobs stored in the user print queue;
- sending a selected print job indication to the print service provider, requesting that the selected print job be printed on the public printer.

16. The method of claim 12, wherein the short-range wireless communication is a communication selected from the group consisting of a near field communication (NFC), a radio frequency identification (RFID) communication, a Bluetooth communication, and a Gigabit Wireless (WiGig) communication.

* * * * *

UNITED STATES PATENT AND TRADEMARK OFFICE
CERTIFICATE OF CORRECTION

PATENT NO. : 9,047,541 B2
APPLICATION NO. : 13/627893
DATED : June 2, 2015
INVENTOR(S) : Ramesh Kavanapillil et al.

Page 1 of 1

It is certified that error appears in the above-identified patent and that said Letters Patent is hereby corrected as shown below:

In the claims

Column 11, line 16, Claim 7, delete "ID" and insert -- ID, --, therefor.

Signed and Sealed this
Twenty-third Day of February, 2016

Michelle K. Lee
*Director of the United States Patent and Trademark Office*